Aug. 14, 1956 S. RATCLIFFE 2,759,100

AUTOMATIC FREQUENCY CONTROL

Filed May 28, 1953 3 Sheets-Sheet 1

Stanley Ratcliffe
Inventor

By Cushman, Darby & Cushman
Attorneys

Aug. 14, 1956 S. RATCLIFFE 2,759,100

AUTOMATIC FREQUENCY CONTROL

Filed May 28, 1953 3 Sheets-Sheet 2

Stanley Ratcliffe
*Inventor*

By Cushman, Darby + Cushman
*Attorneys*

Aug. 14, 1956 S. RATCLIFFE 2,759,100

AUTOMATIC FREQUENCY CONTROL

Filed May 28, 1953 3 Sheets-Sheet 3

Stanley Ratcliffe
*Inventor*

By Cushman, Darby & Cushman
*Attorneys*

United States Patent Office 2,759,100

Patented Aug. 14, 1956

2,759,100

AUTOMATIC FREQUENCY CONTROL

Stanley Ratcliffe, Malvern, England, assignor to National Research Development Corporation, London, England, a British corporation Application May 28, 1953, Serial No. 358,065

Claims priority, application Great Britain June 20, 1952

9 Claims. (Cl. 250—36)

This invention relates to automatic frequency control systems for radio-frequency oscillators of the reflex klystron or resonant cavity velocity modulated type.

The invention is suitable for automatic frequency control in circumstances where the error information, characteristic of the frequency difference between a given reflex klystron oscillation and a desired standard oscillation, is in continuous or discontinuous form. The discontinuous condition occurs, for example, in pulse radar systems where it is desired to maintain a klystron oscillator in a receiver in tune with a pulse source such as a transmitter.

Up to the present time many systems have been evolved for automatic frequency control and the so-called mechanical-cum-reflector type of automatic frequency control has been found to have a wide application. My British patent specification No. 670,238 describes and claims a system of this type which has been found to be satisfactory and my co-pending U. S. application Serial No. 310,891, filed September 22, 1952, describes another such system. The first of these systems has the advantages of mechanical simplicity and of giving optimum power output; the second of these systems has the advantage of circuit simplicity. Where, however, circuit simplicity and good mechanical life, together with ability to work with klystron oscillators having distorted, or asymmetric, power output-frequency curves, are required it is apparent that some further improvement can be effected.

It is an object of this invention to provide an automatic frequency control system in which improvements in circuit simplicity, good mechanical life and ability to work with klystron oscillators having distorted, or asymmetric power output frequency curves, can be provided.

According to the invention there is provided an automatic frequency control system for control of the frequency of an oscillator of the reflex klystron type relative to the frequency of a datum reference source of oscillations, comprising a reflex klystron oscillator adapted for control of its frequency by adjustment of its tuning cavity whilst its reflector is connected to a source of D. C. bias, an error circuit for determining the degree of mistune between the klystron and the reference oscillations and adjustment means for adjusting the cavity of the klystron oscillator in accordance therewith, characterised by the provision of an alternating current coupling between the error circuit and the reflector of the klystron oscillator, the time constant of the coupling being made larger than the response time constant of the klystron oscillator under its cavity adjustment control alone whereby a slow increase in the degree of mistune is counteracted by cavity adjustment and a faster increase in the degree of mistune is counteracted by reflector bias voltage control through the alternating current coupling.

For continuous wave working, that is for a system where the error information is available continuously the error circuit can comprise simply a discriminator of known form; for pulse working the error circuit comprises a discriminator of known form followed by an integrating circuit which accepts the discontinuous error information and produces a continuous form of signal output suitable for the control of a servo motor for cavity adjustment purposes.

Conveniently the alternating current coupling means comprises a condenser.

Search sweep may be provided by allowing the servo motor to drive the cavity adjustment; by means of limit switches on the servo motor shaft the motor may be reversed each time the end of a search sweep is reached so that search may take place continuously over a desired tuning range. A signal test circuit is provided for indicating the presence or absence of a signal in the system which corresponds to an oscillator frequency at which the oscillator can lock-on by means of its control loop formed by the cavity adjustment means.

The signal test circuit thus operates when signals of an approximately correct frequency are received in the error circuit or its preceding circuits. The test circuit in operating disconnects search conditions and connects the error circuit output to control the cavity adjustment. The alternating current coupling remains connected however and ensures that the klystron oscillator control loop locks-on to the approximately correct frequency signals which are encountered. The limit switches which may be toggle switches on a convenient cavity adjustment shaft act in known manner by operating each time the shaft approaches an extreme tuning position to reverse the shaft drive.

The servomotor conveniently comprises a servo motor circuit of the well-known Velodyne type (British Patent No. 606,673); a long tailed pair controls the operation of a servo motor-generator set having a shaft which is coupled to control the cavity adjustment of the klystron oscillator. The voltage fed to the grid of one of the valves of the long-tailed pair controls the speed and direction of rotation of the servo motor; this grid is switched by the signal test circuit to the toggle switch during search and to the output of the error circuit during locked-on automatic frequency control. The toggle switch simply changes over the polarity of the voltage on the grid at each extreme of the cavity adjustment range to effect the search sweep reversals.

A potentiometer driven from the cavity adjustment shaft may be provided as a bias control means to provide the bias for the reflector of the klystron. By this means allowance is automatically made for the law of variation of reflector voltage and frequency whilst search is taking place over the cavity tuned range of the klyston.

In order to show the way in which the invention may be carried into effect two embodiments will now be described by way of example reference being made to the accompanying drawings in which.

Figure 1:
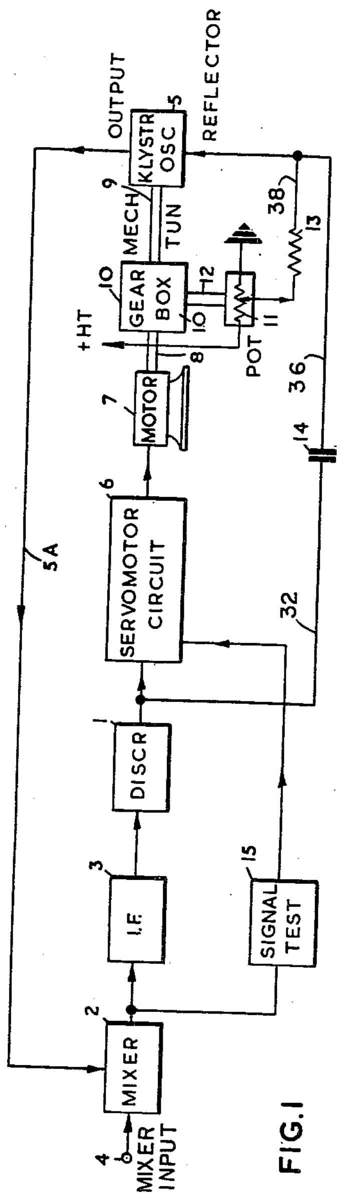
Fig. 1 shows a block schematic of an automatic frequency control system for continuous wave working.

In Fig. 1 a discriminator 1 is fed from a mixer 2 via an intermediate frequency stage 3. The mixer 2 is fed over a lead 4 with a continuous wave signal which acts as a standard for the automatic frequency control of a reflex klystron cavity oscillator 5. The klystron 5 feeds a sample of its output into the mixer 2 via a lead 5A so that the discriminator 1 gives a continuous output which is representative of the degree of error or mistune of the output of the klystron 5 relative to the signal on the lead 4. The output of the discriminator 1 is connected to a servo motor circuit 6 which controls the operation of a servo motor 7. A shaft 8 of the motor 7 drives the cavity adjustment shaft 9 by means of a gear box 10.

Figure 4:
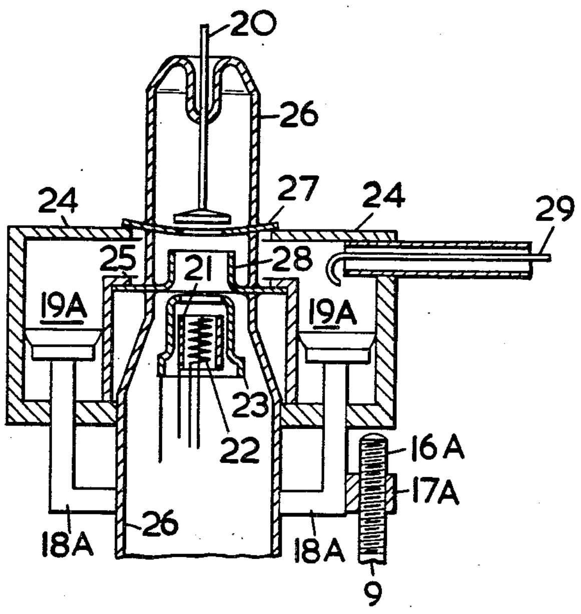
Fig. 4 shows a sectioned view of a reflex klystron oscillator.

The mode of coupling the shaft 9 to the cavity of the klystron 5 is seen from Fig. 4. The shaft 9 is threaded at its end 16A and runs in a nut 17A fixed to the plunger system 18A of a reflex klystron tube cavity 19A whereby rotation of the shaft 9 changes the tuning of the cavity 19A. The klystron valve itself is shown in part and comprises a reflector 20, a cathode 21 with a heater 22 and a gun 23. Walls 24 and 25 of the external cavity 19A are extended to within the glass envelope 26 of the klystron tube cavity 19A by means of copper discs 27 and 28 sealed in the envelope 26. The output of the klystron is taken from the cavity 19A by means of a probe 29. A tube of this type is described in the Bell System Technical Journal, volume XXVI, No. 3, July 1947, page 553 et seq. as W. E. No. 707–A.

Reflector bias for the klystron 5 is obtained from a potentiometer 11 which is driven by a shaft 12 of the gear box 10. A resistor 13 serves as a stopper resistance in known manner.

Neglecting for the moment the other connections shown it is readily seen that the system as so far described comprises a so-called mechanical automatic frequency control arrangement whose response is slow and largely determined by the permissible rate of change of frequency of the cavity tuning of klystron 5 when driven by the motor 7.

Now, the output of discriminator 1 is fed to a condenser 14 which itself feeds to the reflector of the klystron 5. The reflector of the klystron 5 is already supplied with a bias approximately appropriate to the frequency of oscillation by virtue of the potentiometer 11. This ensures that the reflector voltage remains reasonably near to the value for optimum output.

The condenser 14 allows quick changes of output of the discriminator 1 to influence correspondingly the bias voltage on the reflector of the klystron 5. Thus for quick changes of output of the discriminator 1 the reflector bias voltage changes and the frequency of the klystron 5 changes towards the correct value substantially instantaneously. This change of voltage applied at the reflector disappears exponentially due to the time constant of the condenser 14 but by the time the reflector bias correction has disappeared the mechanical part of the automatic frequency control will have acted to control the cavity. Accordingly the time constant of the alternating current coupling (condenser 14) should be greater than the response time constant of the cavity automatic frequency control servo loop alone. The cavity control loop is then able to perform its correction after the substantially instantaneous but non-persisting electronic correction on the reflector has been performed.

In this way slow changes of frequency of oscillation are dealt with by the mechanical part of the control and quicker changes of frequency are dealt with electronically by the feed from the discriminator 1 to the reflector via the condenser 14.

Search facilities are provided by means of a signal test circuit 15 which operates a relay (not shown in Fig. 1) in the servo motor circuit 6 whenever a signal of the approximately correct frequency is received from the output of the mixer 2. This relay in the servo motor circuit 6 controls the application of suitable search conditions or of cavity automatic frequency control conditions to the servo motor 7. The automatic frequency control conditions are those given by the discriminator 1 and the search conditions are provided by a toggle switch circuit (not shown in Fig. 1) described below.

Figure 2:
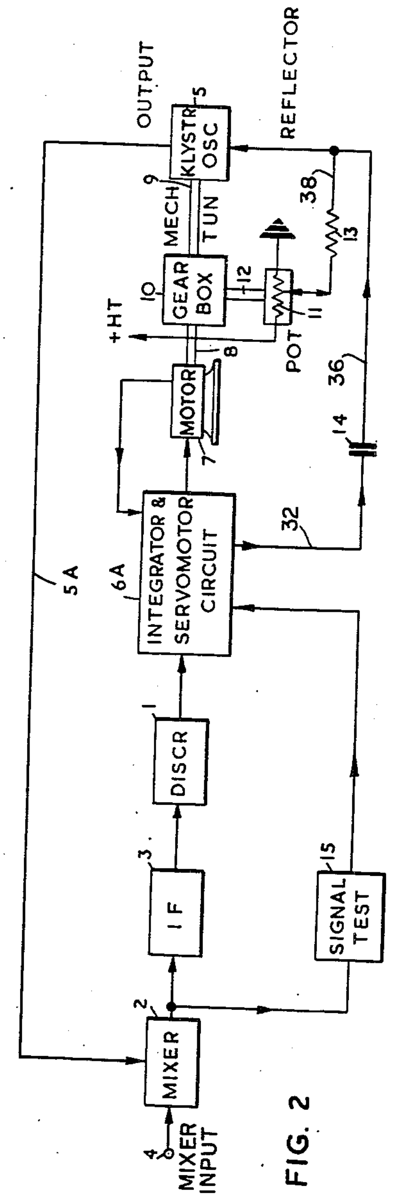
Fig. 2 shows the system of Fig. 1 adapted for pulse working.

In Fig. 2 the arrangement of Fig. 1, corresponding parts of the circuit receiving corresponding designations, is shown adapted for use in a pulse system; that is a system in which the frequency input on the lead 4 of Fig. 1 consists of pulses as opposed to the continuous wave input previously referred to.

The general operation of the circuit is similar to that of the circuit of Fig. 1 but an integrator and servo motor circuit 6A is provided instead of the servo motor circuit 6 and, the servo motor 7 is arranged, by way of example, as a so-called Velodyne circuit, the term "Velodyne" referring to an electromechanical system in which the speed of rotation is held closely proportional to the input voltage by feedback methods. Further information in Velodyne circuits may be had by referring to pages 1256 et seq. of the Journal of the Institution of Electrical Engineers, vol. 93, Part IIIA.

The circuit 6A receives the pulse output of the discriminator 1 and acts as an integrator to provide a continuous error signal which then controls the servo motor part of the circuit 6A. The provision of feedback from the servo motor 7 to the circuit 6A in the Velodyne circuit assists adjustment of the servo motor circuit conditions to compensate for initial starting friction occurring in the mechanical tuning part of the klystron 5 and its gear box 10.

In order to show the action of the circuit 6A more clearly reference will now be made to Fig. 3 in which a detailed example of such a circuit is given.

The output of the signal test circuit 15 is connected to a terminal 19 of a relay SI. The relay SI is operated from the signal test circuit 15 whenever there is a signal of approximately correct frequency in the output of the mixer 2.

The pulse output of the discriminator 1 is applied to terminals 16 and 17 of a transformer 18. From the secondary of the transformer 18 the discriminator output passes through the diodes of a valve V1 to an integrator valve V2. The operation of the circuit for valves V1 and V2 is similar to that described for the so-called diode-phantastron circuit described on pages 64 et seq. in Microwave Receivers, 1948, First Edition, edited by S. N. Van Voorhis as No. 23 of the Radiation Laboratory Series and published by McGraw-Hill. The output of the integrator valve V2 is connected to the grid of the valve V3 of a long-tailed pair V3, V4 (relay contact SI 1 in the operated condition). The long-tailed pair V3, V4, forms part of a circuit of the Velodyne type. A motor-generator pair M, G in this Velodyne circuit drives the cavity adjustment shaft of the klystron 5 (Fig. 2) through the gear box 10 (Fig. 2).

The signal on the grid of the valve V3, according to its amplitude and polarity, determines the speed and direction of rotation of the shaft of the motor-generator pair M, G. The integrated output of the discriminator 1 (Fig. 2) from the integrator valve V2 provides a suitable signal for control of the Velodyne circuit and hence of the cavity tuning; the output of the integrator valve V2 being the integrated output of the discriminator 1 (Fig. 2) is larger the longer the frequency error of the klystron oscillator 5 (Fig. 2) persists and varies in polarity according to the sense of the eror in the klystron frequency. In the example the actual mechanical maximum rate of change of tuning of the Velodyne-Klystron combination was arranged to be 10 mc./sec./sec. This represents a rate which was considered suitable for the particular application and for the components (e. g. klystron and motor-generator) used. It will be easily seen that even if the rate of frequency drift at any time were to exceed the immediate capacity of the system to correct it the motor-generator pair would continue in the correct direction of rotation until the system were finally corrected.

The output of the integrator valve V2 is also connected to the reflector of the klystron 5 (Fig. 2) via the condenser 14 (Fig. 2). Thus the reflector of the klystron receives a signal which is able to act in the same way as the signal from the discriminator 1 to the reflector (via the condenser 14) in the arrangement of Fig. 1.

Figure 3:
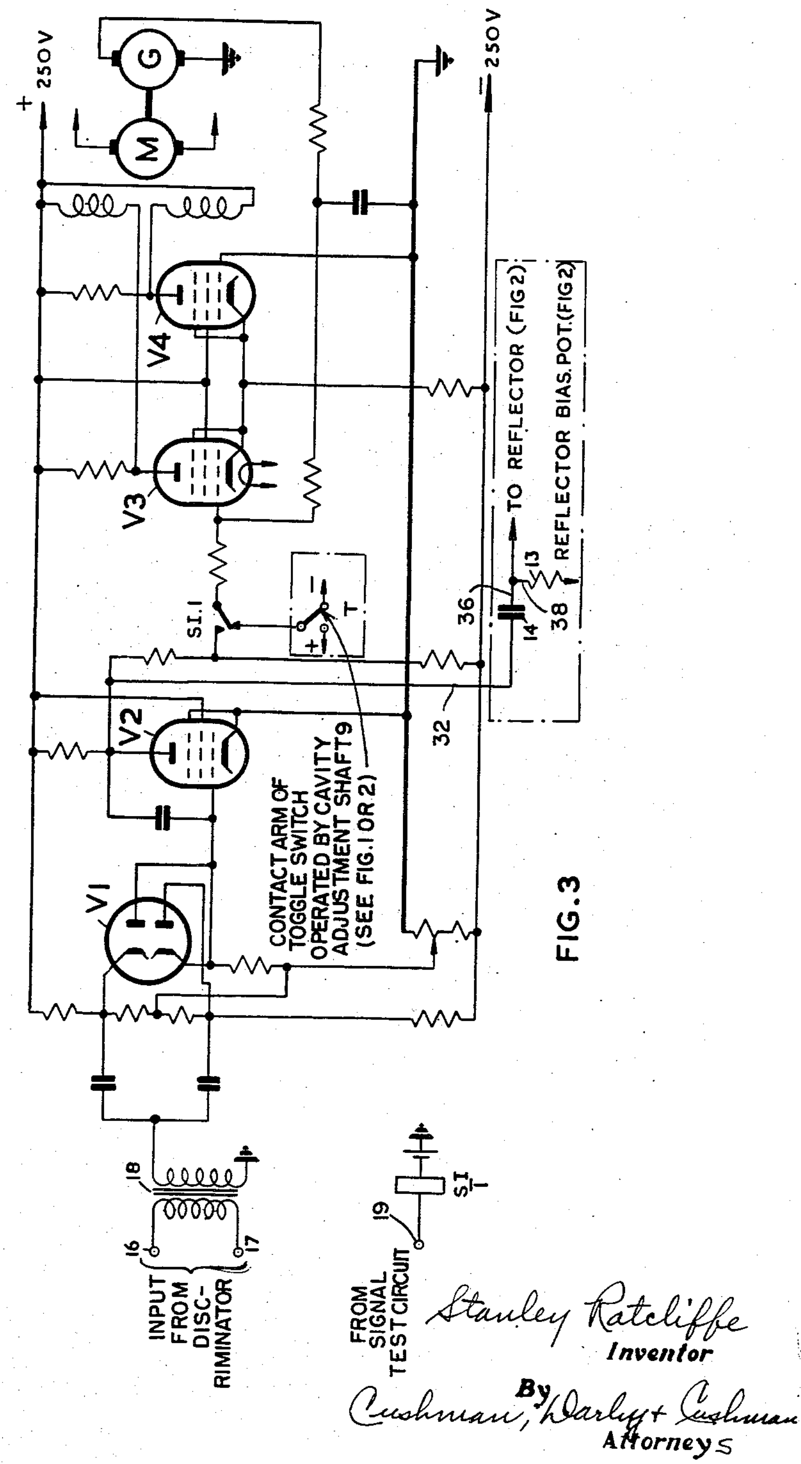
Fig. 3 shows a detail of the integrator and servo motor circuit of Fig. 2.

The circuit arrangements of Figs. 2 and 3 therefore perform an equivalent function in the case of pulse error information to that of Fig. 1 in the case of continuous error information.

Also shown in Fig. 3 is the toggle switch element controlling the search circuit. The contact arm of the toggle switch T is operated by the cavity adjustment shaft 9 (Fig. 1 or 2) and is arranged to switch over at each extreme of the cavity adjustment range and in switching over reverses the polarity of the grid of the valve V3. (The relay SI is unoperated because the search condition presumes no approximately correct frequency signal from the mixer; the relay contact SI 1 is therefore unoperated in the condition shown.) The Velodyne motor 7 being sensitive in its direction of rotation to the polarity of the grid of valve V3, the tuning of the klystron 5 is reversed in direction as each extreme of its tuning range is reached. This gives the search facility.

The overall stability of the automatic frequency control system of Figs. 2 and 3 may be analysed approximately. It is, however, extremely laborious to take account formally of the modification of behaviour owing to the finite pulse recurrence frequency but a simplification may be achieved by discussing the response of the cavity adjustment closed loop system on the assumption that the response of the klystron to changes of reflector bias fed through the alternating current coupling from the discriminator is instantaneous. Stability criteria may be obtained in this manner.

Figure 5:
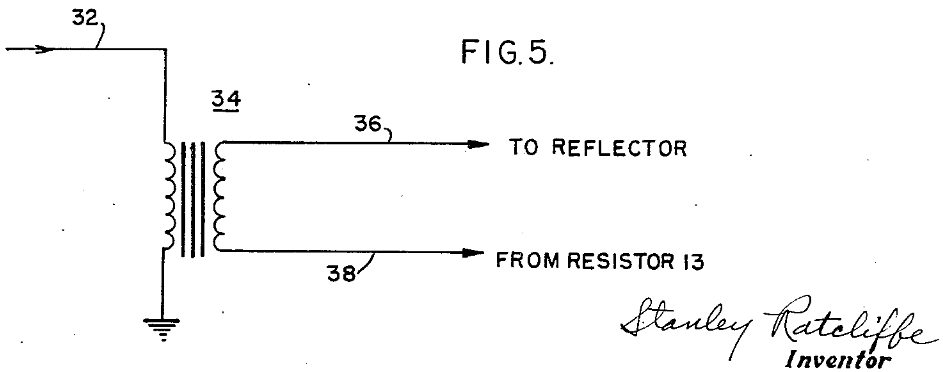
Fig. 5 shows an alternative alternating current coupling means.

It should be mentioned that the alternating current coupling between the discriminator and the reflector may be embodied in other forms than the condenser 14 exemplified in the description above and may take the form, for example, of a transformer 34, as shown in Figure 5, having a suitable time constant. The time constant criterion is that the coupling time constant must be greater than the response time constant of the cavity adjustment automatic frequency servo control loop.

I claim:

1. An automatic frequency control system for control of the frequency of an oscillator of the reflex klystron type relative to the frequency of a datum reference source of oscillations, comprising a reflex klystron oscillator adapted for connection at its reflector to a source of bias voltage and adjustable in frequency by adjustment of its cavity dimensions, adjustment means comprising a servo motor of the feed-back control type coupled at its shaft to said cavity for controlling the frequency thereof, frequency measuring means comprising a mixer circuit and an error circuit, said mixer circuit being adapted to mix the klystron and reference oscillations, said error circuit being adapted to derive from the output of the mixer circuit a signal characteristic of the degree of mistune between the klystron and the reference oscillations and said motor being adapted to receive the signal from the error circuit and to adjust the klystron oscillator frequency in response to said signal, and an alternating current coupling means for coupling the error circuit to the reflector of the reflex klystron, the time constant of the coupling means being made larger than the response time constant of the klystron oscillator when subjected to control by cavity adjustment alone, whereby a slow increase in the degree of mistune is counteracted by cavity adjustment and a faster increase in the degree of mistune is counteracted by reflector bias voltage control through the alternating current coupling means.

2. An automatic frequency control system as in claim 1, wherein the error circuit comprises a discriminator circuit and an integrator circuit, the integrator circuit being connected to receive the output of the discriminator circuit and the output of the integrator circuit constituting the output of the error circuit.

3. An automatic frequency control system as in claim 1 wherein a signal test circuit is provided to indicate when signals are present in the error circuit coresponding to an output frequency of the oscillator at a lock-on frequency of the system, and search means are provided to sweep the cavity adjustment means over its adjustment range, the signal test circuit being arranged to inhibit operation of the search means when the oscillator frequency is at a lock-on frequency.

4. An automatic frequency control system as in claim 3 wherein limit switch means cooperates with said cavity adjustment means to operate at each extreme of the cavity adjustment range to effect reversal of the movement of the adjustment means.

5. An automatic frequency control system as in claim 4 wherein said source of bias voltage is adjustable by means adapted to be controlled by said cavity adjustment means.

6. An automatic frequency control system as in claim 1 wherein a signal test circuit is provided to indicate when signals are present in the error circuit corresponding to an output frequency of the oscillator at a lock-on frequency of the system, and search means are provided to sweep the cavity adjustment means alone over its adjustment range, the signal test circuit being arranged to inhibit operation of the search means when the oscillator frequency is at a lock-on frequency, whereby the error circuit during search remains connected through the alternating current coupling to the reflector to control the oscillator frequency according to error signals appearing in the error circuit so that as the oscillator frequency approaches the lock-on frequency the error signal is available and is applied through the alternating current coupling to control the reflector before the slower cavity control can operate.

7. An automatic frequency control system for control of the frequency of an oscillator of the reflex klystron type relative to the frequency of a datum reference source of oscillations, comprising a reflex klystron oscillator adapted for connection at its reflector to a source of bias voltage, and adjustable in frequency by adjustment of its cavity, adjustment means comprising a motor of the servo type coupled at its shaft to said cavity for controlling the frequency thereof, frequency measuring means comprising a mixer circuit and an error circuit, said mixer circuit being adapted to mix the klystron and reference oscillations, said error circuit being adapted to derive from the output of the mixer circuit a signal characteristic of the degree of a mistune between the klystron and reference oscillations and said motor being adapted to receive the signal from the error circuit and to adjust the klystron oscillator frequency in response to said signal so that an increase in the degree of mistune is counteracted by said cavity adjustment, and means operative in response to the operation of said motor to adjust the value of the bias voltage applied to said reflector.

8. A system as in claim 7 and further including an alternating current coupling means for coupling the error circuit to the reflector, the time constant of the coupling means being made larger than the response time constant of the klystron oscillator when subjected to control by cavity adjustment alone, whereby a slow increase in the degree of mistune is counteracted by cavity adjustment and a faster increase in the degree of mistune is counteracted by reflector bias voltage control through the alternating current coupling means.

9. An automatic frequency control system for control of the frequency of an oscillator of the reflex klystron type relative to the frequency of a datum reference source of oscillations, comprising a reflex klystron oscillator adapted for connection at its reflector to a source of bias voltage and adjustable in frequency by adjustment of its cavity, adjustment means comprising a motor of the servo type coupled at its shaft to said cavity for controlling the frequency thereof, frequency measuring means comprising a mixer circuit and an error circuit, said mixer circuit being adapted to mix the klystron and reference oscillations, said error circuit being adapted to derive from the output of the mixer circuit a signal characteristic of the degree of mistune between the klystron and the reference oscillations and said motor being adapted to receive the signal from the error circuit and to adjust the klystron oscillator frequency in response to said signal, and an alternating current coupling means for coupling the error circuit to the reflector of the reflex klystron, the time constant of the coupling means being made larger than the response time constant of the klystron oscillator when subjected to control by cavity adjustment alone, whereby a slow increase in the degree of mistune is counteracted by cavity adjustment and a faster increase in the degree of mistune is counteracted by reflector bias voltage control through the alternating current coupling means, and further including a signal test circuit to indicate when signals are present in the error circuit corresponding to an output frequency of the oscillator at a lock-on frequency of the system, and search means to sweep the cavity adjustment means alone over its adjustment range, the signal test circuit being arranged to inhibit operation of the search means when the oscillator frequency is at a lock-on frequency, whereby the error circuit during search remains connected through the alternating current coupling to the reflector to control the oscillator frequency acording to error signals appearing in the error circuit so that as the oscillator frequency approaches the lock-on frequency the error signal is available and is applied through the alternating current coupling to control the reflector before the slower cavity control can operate.

References Cited in the file of this patent

UNITED STATES PATENTS

| | | |
|---|---|---|
| 2,452,575 | Kenny | Nov. 2, 1948 |
| 2,541,066 | Jaynes | Feb. 13, 1951 |

FOREIGN PATENTS

| | | |
|---|---|---|
| 599,611 | Great Britain | Mar. 17, 1948 |